United States Patent [19]

Matsuyama et al.

[11] Patent Number: 4,517,246

[45] Date of Patent: May 14, 1985

[54] PARTICULATE POLYOLEFIN MOLDING MATERIAL

[75] Inventors: Kiyoshi Matsuyama; Kenji Ochi; Hiroyuki Ogawa, all of Ehime; Takuya Suzaki; Kazuyoshi Imai, both of Shizuoka, all of Japan

[73] Assignee: Sumitomo Chemical Company, Limited, Osaka, Japan

[21] Appl. No.: 437,597

[22] Filed: Oct. 29, 1982

[51] Int. Cl.$^3$ .......................... B32B 5/16; B32B 9/00; B05D 1/02
[52] U.S. Cl. .................................. 428/407; 428/403; 427/422
[58] Field of Search ................. 428/407, 403; 427/422

[56] References Cited

U.S. PATENT DOCUMENTS 3,911,193  10/1975  Resz et al. ...................... 428/407
4,043,962  8/1977   Adler et al. ..................... 428/407

Primary Examiner—Marion E. McCamish
Assistant Examiner—Beverly K. Johnson
Attorney, Agent, or Firm—Sughrue, Mion, Zinn, Macpeak, and Seas

[57] ABSTRACT

A particulate polyolefin molding material is disclosed. The material is comprised of a particulate polyolefin particle having a bulk density of 0.45 g/cc or more and a mean particle size of 150 to 2,000$\mu$, and a layer comprising a compounding additive and a binder formed on the surface of the particle. The material can be used in producing molded articles without first forming the material into pellets as is conventionally done.

10 Claims, No Drawings

PARTICULATE POLYOLEFIN MOLDING MATERIAL

FIELD OF THE INVENTION

This invention relates to a particulate polyolefin molding material, which is covered with compounding additives such as a filler, a stabilizer, a pigment, etc. More particularly, it relates to a particulate polyolefin molding material comprising a particulate polyolefin particle and a layer comprising at least one compounding additive formed on the surface of the particle.

BACKGROUND OF THE INVENTION

Known methods of preparing pellets used in molding involve the addition of compounding additives such as a filler, a stabilizer, and a pigment to polyolefin, heat-melting and kneading the mixture, and granulating it to prepare the pellets. The pellets formed in this manner are then subjected to molding processing.

However, pelletizing requires enormous energy and expensive equipment making the process industrially disadvantageous. Therefore, attempts have been made to mix particulate polyolefin with compounding additives and directly molding the resulting mixture without the above-described pelletizing step. However, mere mixing of the compounding additives such as a stabilizer, a pigment, and a filler with particulate polyolefin fails to uniformly disperse the compounding additives in polyolefin. This leads to adverse influences on the quality of resulting moldings. Of the compounding additives, a filler is generally added in a larger amount than a stabilizer or a pigment and has a finer particle size and smaller bulk density than that of particulate polyolefin. Therefore, the mere mixing with particulate polyolefin is liable to result in classification and formation of non-uniform mixture. In addition, when such a mixture is subjected to molding processing such as injection molding processing, the following problems arise:

(1) Fine filler particles are caught by the air and form dust when the mixture is thrown into a hopper or in the procedure of, for example, transferring the mixture from hopper to hopper.
(2) Such a mixture is poor in feeding with a screw, which prolongs the plasticizing time, leading to a reduction in molding ability. In addition, air is trapped in pockets to the extent that deaeration becomes insufficient, resulting in silver streaks and scorch of moldings.
(3) Moldings produced therefrom have poor appearance and poor mechanical properties due to the non-uniform dispersion of the filler in the moldings.

These defects become more serious as the amount of filler increases.

For the reasons described above, direct molding of the mere mixture has generally not been conducted and, under the present situation, the mixture is first pelletized, then subjected to molding processing.

The present inventors have carried out intensive investigations to obtain a polyolefin molding material comprised of particulate polyolefin and compounding additives which can be directly molded without the above-described pelletizing step. As a result of these studies the present inventors have found that a particulate polyolefin molding material comprising a particulate polyolefin particle and a layer comprising at least one compounding additive formed on the surface of the particle is excellent in moldability and gives uniform moldings.

SUMMARY OF THE INVENTION

The present invention is directed to a particulate polyolefin molding material. The material is comprised of a particulate polyolefin particle having a bulk density of 0.45 g/cc or more and a mean particle size of 150 to 2,000$\mu$, and a layer comprising at least one compounding additive and a binder formed on the surface of the particle.

The particulate polyolefin molding material of the present invention is comprised of polyolefin particles as nuclei having one or more compounding additives strongly adhered thereto with a binder. Accordingly, the material has a high bulk density, good fluidity, and direct moldability and, in addition, moldings obtained therefrom are equal to those obtained by conventional molding of pellets in appearance and mechanical properties due to the good dispersion of the compounding additives.

DETAILED DESCRIPTION OF THE INVENTION

The particulate polyolefin used in the present invention is a homopolymer of ethylene or propylene, a random copolymer or block copolymer of ethylene and another $\alpha$-olefin or of propylene and another $\alpha$-olefin, or the like. The crystalline polyolefin having a bulk density of 0.45 g/cc or more and a mean particle size of 150 to 2,000$\mu$ is preferable. If the bulk density is less than 0.45 g/cc, voids are formed inside and between the particles to such an extent that complete deaeration upon molding cannot be conducted. Therefore, the use of a polymer having a bulk density of less than 0.45 g/cc is not preferable. If the particle size is too small, the particles are blown off by air currents. Furthermore, if the particle size is 100$\mu$ or less, there is an additional danger of dust explosion. Because of these problems it is not desirable to make the particles too small. However, if the particles are too large, the dispersion of the compounding additives deteriorates in resulting moldings.

The more spherical the particles and the more narrow the particle size distribution, the more preferable.

Properties of the particulate polyolefin are fundamentally determined by the polymerization catalyst used for its production.

A process for producing a polymer containing propylene as a major component is illustrated below as an example of obtaining polyolefin having preferable properties suited for the present invention. The polymer is obtained by polymerizing propylene or both propylene and another olefin using a catalyst system in the presence if an inert solvent, or in the substantial absence of an inert solvent, that is, in an excess liquid propylene or in gas phase. The catalyst system is comprised of a titanium trichloride composition (including carrier-supported type) prepared by reducing titanium tetrachloride with an organoaluminum compound and activating the reduced product, an organoaluminum compound and, if necessary, an electron donative compound.

Specific examples of processes for preparing the titanium trichloride composition are disclosed in a number of publications such as Japanese Patent Application (OPI) Nos. 34478/72, 76196/76, 33289/78, 112973/79, 119576/79, 11985/79, etc. (The term "OPI" as used herein refers to a "published unexamined Japanese patent application", hereinafter the same.)

The term "compounding additives" as used herein means fillers, stabilizers, pigments, and various other auxiliary agents conventionally added to polyolefin for improving physical or chemical properties of polyolefin. The amounts of these additives to be used are the same as the amounts conventionally added to polyolefin. Examples of useful fillers include inorganic fillers such as silica, diatomaceous earth, alumina, titanium oxide, iron oxide, zinc oxide, magnesium oxide, pumice powder, aluminum hydroxide, magnesium hydroxide, calcium carbonate, magnesium carbonate, calcium sulfate, barium sulfate, talc, clay, mica, glass beads, carbon black, etc., organic fillers such as wood powder, coating refuse, pulp, paper powder, etc., and mixtures thereof. The size of the filler particles is not particularly limited, but is usually $50\mu$ or less, preferably $30\mu$ or less. The size may be properly selected from the above-described range taking into consideration the mean particle size of the particulate polyolefin. The smaller the particle size of the particulate polyolefin nuclei, the finer filler particles should be.

The amount of the filler to be used is generally in the range of 10 to 200 parts by weight, preferably 10 to 150 parts by weight, per 100 parts by weight of the particulate polyolefin.

The stabilizers are various antioxidants, light stabilizers, etc. which have been conventionally added to improve the stability and quality of polyolefin. The stabilizers may be used alone or in a combination of two or more.

Examples of useful stabilizers include antioxidants such as 2,6-di-t-butyl-p-cresol, calcium stearate, tetra[methylene-3-(3,5-di-t-butyl-4-hydroxyphenyl)propionate]-methane, etc., and light stabilizers such as 2-(2'-hydroxy-5'-methylphenyl)benzotriazole, 2-hydroxy-4-octylbenzophenone, etc.

Other auxiliary agents which may be used include fire retardants such as antimony oxide, dodecachloropentacyclodecane, etc. and lubricants.

Such of these stabilizers have a lower melting point than that of particulate polyolefin and exert an analogous function to that of a binder. However, independent use of such stabilizer is insufficient to uniformly and strongly adhere fillers, other stabilizers, pigments, etc. to the surface of particulate polyolefin. The pigments are organic or inorganic pigments in use for coloring polyolefin.

The binder plays a role of strongly adhering the compounding additives such as a filler, a stabilizer, etc. to the surface of particulate polyolefin particles.

Useful binders that are preferably used have good compatibility with particulate polyolefin nuclei. If the compatibility is poor, dispersion of the binder in the surface portion is liable to become bad upon molding a molding material containing a large amount of the binder, and to result in deterioration in quality of moldings. Thus, such binders are not preferable.

Examples of the binder include olefinic polymers such as polyethylene, ethylene-vinyl acetate copolymer, ethylene-unsaturated carboxylic acid ester copolymer (e.g., ethylene-methyl methacrylate copolymer, etc.), ethylene-unsaturated carboxylic acid metal salt copolymer (e.g., ethylene-magnesium or zinc acrylate copolymer, etc.), copolymer between propylene and other olefin (e.g., propylene-ethylene copolymer, propylene-butene-1 copolymer, etc.), polyethylene or polypropylene modified with unsaturated carboxylic acid such as maleic anhydride, ethylene-propylene rubber, atactic polypropylene, etc.; petroleum resins; polyalkylene glycols such as polyethylene glycol and polypropylene glycol; and the like, with the olefinic polymers being preferable. These binders may be used alone or in combination.

In general, moldings of filler-containing polyolefin has higher rigidity and lower impact strength than that of filler-free moldings.

On the other hand, the use of olefinic polymer as a binder in the particulate polyolefin molding material of the present invention prevents the deterioration of, or improves, the impact strength, thus being preferable.

For example, when using particulate polypropylene, it is preferable to use polyethylene, propylene-butene-1 copolymer, ethylene-propylene rubber, atactic polypropylene, etc. as a binder due to the improved impact strength.

The binder preferably has a lower melting point than that of the particulate polyolefin to be used as nuclei by at least 3° C. A proper binder may be selected by taking into consideration the melting point of the particulate polyolefin.

The amount of binder to be used varies depending upon the kinds and amounts of the compounding additives used, and may properly be determined in view of these factors. Where the adhering amount of filler is 10 to 200 parts by weight per 100 parts by weight of the particulate polyolefin, the weight ratio of binder/filler is usually about 1/10 to about ½, preferably about 1/10 to about 1/5. With other compounding additives, the amounts to be used may properly be decided by taking the adhering amount of the compounding additives into consideration. However, since they are generally used in less amounts than the filler, the amount of the binder may be more than that of the compounding additives.

One example of the process of the present invention for producing a particulate polyolefin molding material is described below.

A jacketed high speed mixer for dry-blending particulate resins is used. The mixer is equipped with a stirrer to fluidize and blend the content at high speed and can heat the content. For example, it is possible to use a Henschel mixer, a Super Mixer (trade name; made by Kawata Mfg. Co.), or the like. A particulate polyolefin, a binder, and at least one compounding additive are heated therein to a temperature a little higher than the melting point of the binder under mixing. Thus, the molten binder strongly and uniformly adheres on the surface of the particulate polyolefin while including the compounding additives. The content is taken out directly or after it is cooled to some extent to obtain a particulate polyolefin molding material having good fluidity. In producing the molding material in the above-described manner, the melting point of the binder is preferably lower than that of the particulate polyolefin by at least 3° C. in order to prevent the particulate polyolefin from melting. To keep the polyolefin from melting the greater the difference in melting point, the more preferable.

In order to improve dispersion of the binder and minimize the time for the binder to be melted, the binder suitably possesses a mean particle size of $1,000\mu$ or less. The mean particle size of the binder is preferably smaller than that of the particulate polyolefin used.

The composition and structure of the layer to be formed on the particulate polyolefin can be changed by properly changing the mixing order of the particulate polyolefin, binder, and at least one compounding additive or by raising the temperature with heat at a different stage in the process.

Several examples thereof are illustrated below, which, however, do not limit the present invention in any way.

(1) When a particulate polyolefin, a binder, and at least one compounding additive are added at a time to a mixer and heated under mixing, a uniform, single layer of binder and compounding additive is formed on the surface of the particulate polyolefin. This process suffices when the compounding additives are those which are used in small amounts such as a stabilizer, a pigment, etc. or when a filler is used in a small amount.

(2) The following process is suited for the case where the compounding additive is a filler to be used in a large amount. That is, first, a particulate polyolefin and part of the filler and, in some cases, other compounding additives such as a stabilizer are added to a mixer and heated to a temperature about 3 to 20° C. lower than the melting point of the particulate polyolefin under mixing to thereby adhere a layer mainly comprising the filler on the surface of the particulate polyolefin. Then, the remaining filler and a binder are added to the mixer (the order of addition being optional; and previous mixing of the two being possible), and heated, under mixing, to a temperature lower than the melting point of the particulate polyolefin and higher than the melting point of the binder. Thus, there is obtained a molding material comprising polyolefin particles having formed thereon an inner layer containing, for example, a stabilizer or a pigment in a rich amount and an outer layer mainly containing a filler and a binder. Moldings obtained using this molding material contain a well dispersed filler in spite of the large amount of the filler. In addition, this process makes it possible to remarkably reduce the amount of the binder to be used.

(3) First, a particulate polyolefin and compounding additives other than a filler (e.g., a stabilizer, a pigment, etc.) are added to a mixer to mix. Then, a filler and a binder are added to the mixture, and the temperature of the content is raised to a temperature lower than the melting point of the particulate polyolefin and higher than the melting point of the binder. Thus, there can be obtained a molding material comprising polyolefin particles having formed thereon an inner layer containing, for example, a stabilizer or a pigment in a concentrated amount and an outer layer mainly containing the filler and the binder. Moldings obtained by using this molding material contain particularly well dispersed compounding additives such as a pigment contained in the inner layer.

Additionally, a particulate polyolefin molding material comprising particulate polyolefin particles having formed on the surface thereof a stabilizer-containing layer (particularly a stabilizer-rich layer) is prevented from being deteriorated with time. Accordingly, it can be stored for a long time.

The molding material of the present invention is subjected to generally known molding processing such as injection molding, blow molding, extrusion molding, sheet molding, etc. without first going through a pelletizing step. The thus obtained moldings containing, for example, a filler well dispersed therein are suitably used as parts of automobiles (e.g., cases for car heater and air conditioner, instrument panel, etc.), outer frame, support or other parts of household appliances, bedding drier, vacuum cleaner, speaker, record player, etc.

The present invention will now be described in more detail by referring to examples of preferred embodiments of the present invention which however, are not to be construed as limiting the present invention in any way.

EXAMPLE 1

(1) Polymerization of Propylene:

The atmosphere in a stainless steel-made, stirring type autoclave having an inside volume of 3,000 liters was replaced with nitrogen. Then, 1,800 g of diethylaluminum chloride and 50 g of titanium trichloride solid catalyst (B) obtained by the process shown in Japanese Patent Application (OPI) No. 33289/78, Example 15, catalyst preparation 3 were charged in the autoclave, and hydrogen was introduced thereinto in an amount corresponding to a partial pressure of 0.5 kg/cm$^2$.

Then, 840 kg of liquid propylene was pressed into the autoclave, and the autoclave was kept at 65° C. for 4 hours to polymerize.

After completion of the polymerization, unreacted monomer was purged, and 60 liters of methanol was added thereto to decompose the catalyst. The thus produced polypropylene was collected by centrifugation and dried at 60° C. under reduced pressure to obtain 390 kg of spherical particulate polypropylene having a uniform particle size. The melting point of this polypropylene was measured on a differential scanning calorimeter (made by Perkin-Elmer) and found to be 165° C.

This particulate polypropylene had a mean particle size of about 600$\mu$ and a bulk density of about 0.49 g/cc.

(2) Production of molding material:

A 1 kg/cm$^2$G steam was introduced into a jacket of a 300-l Super Mixer (trade name; made by Kawata Mfg. Co.). Then, 22.5 kg of the particulate polypropylene obtained in propylene polymerization (1), 120 g of a stabilizer {tert-butyl-p-cresol:tetra[methylene-3-(3,5-di-t-butyl-4-hydroxyphenyl)propionate]-methane=2:1 by weight}, 1.5 kg of 30-mesh sieve-passing powder of SUMIKATHENE ® G801 (low-density polyethylene; m.p.: 110° C.; made by Sumitomo Chemical Co., Ltd.) (as a binder), and 6 kg of talc having a mean particle size of 8$\mu$ were thrown into the mixer and stirred at 720 rpm.

The stirring was stopped 12 minutes after initiation of the stirring when the temperature of the mixture rose to 115° C., and the content was withdrawn from the mixer to obtain a spherical, free-flowing, particulate polypropylene molding material having a high bulk density. Talc uniformly and stongly adhered so much to particulate polypropylene that no talc was parted even when the particulate polypropylene molding material was strongly rubbed one's hand with a finger. Almost no adhesion was observed on the inside wall of the mixer.

(3) Molding:

This particulate polypropylene molding material was molded using an injection molding machine (M-32-SJ; made by Meiki Mfg. Co., Ltd.; screw diameter: 25 mm; injection amounts: 1 ounce). The material was mixed well with the screw, and was plasticized in 12 to 13 seconds. The resulting molding had good appearance with no silver streaks and foams. When part of the molding was formed into a thin sheet using a hot press to observe the dispersed state of talc, a good dispersed state was confirmed.

EXAMPLE 2

(1) Compounding:

15 kg of the particulate polypropylene obtained in Example 1-(1), 90 g of the same stabilizer as used in Example 1, 3 kg of SUMIKATHENE ® G801, and 12 kg of calcium carbonate powder having a mean particle size of 10μ were mixed in the same manner as in Example 1-(2) to obtain a molding material having the same properties as that obtained in Example 1, with no isolated calcium carbonate being observed.

The properties of this molding material are shown in Table 1.

(2) Molding:

This molding material was molded under the same condition as shown in Example 1-(3). The results are shown in Table 2.

EXAMPLE 3

(1) Preparation of molding material:

120 g of the same stabilizer and 3.0 kg of the same talc as used in Example 1 were added to 23.4 kg of the particulate polypropylene obtained in Example 1-(1) and mixed, then heated to 145° C. At this stage, almost all the talc particles adhered to the surface of the particulate polypropylene. Subsequently, 3.0 kg of remaining talc, then 0.6 kg of SUMIKATHENE ® G801 power were added thereto, and the content was mixed for an additional 5 minutes. Then, steam introduction into the jacket of the Super Mixer was discontinued and, instead, a cooling water was introduced into the jacket. When cooled to 80° C., the content was withdrawn out of the mixer to obtain a spherical, free-flowing molding material not containing free talc. The results thus obtained are shown in Table 1.

(2) Molding:

This molding material was molded in the same manner as in Example 1-(3).

The results thus obtained are shown in Table 2.

EXAMPLE 4

(1) Preparation of molding material:

22.5 kg of the particulate polypropylene obtained in Example 1-(1), 120 g of the same stabilizer as used in Example 1, 1.5 kg of a binder of high-density polyethylene powder (m.p.: 140° C.), and 6 kg of talc having a mean particle size of 8μ were thrown into the Super Mixer. A 2 kg/cm²G steam was introduced into the jacket, and the content was stirred at 720 rpm. The introduction of steam was discontinued 22 minutes after initiation of stirring when the temperature of the content rose to 145° C. and, instead, a cooling water was introduced into the jacket, and the content was stirred at 360 rpm and, at 80° C., withdrawn out of the mixer to obtain a spherical, free-flowing molding material having the same properties as that obtained in Example 1-(2).

(2) Molding:

This molding material was molded under the same condition as in Example 1-(3). The results thus obtained are shown in Table 2.

EXAMPLE 5

(1) Preparation of molding material:

In the same manner as in Example 4-(1) except for using propylene-butene-1 copolymer (content of butene-1: 18 wt %; m.p.: 140° C.) as a binder, there was prepared a molding material having no free talc as in Example 4-(1). The results thus obtained are shown in Table 1.

(2) Molding:

This molding material was molded under the same condition as in Example 1-(3). The results thus obtained are shown in Table 2.

EXAMPLE 6

(1) Preparation of molding material:

22.5 kg of the particulate polypropylene obtained in Example 1 and 120 g of the same stabilizer as used in Example 1 were thrown into the Super Mixer. A 1 kg/cm²G steam was introduced into the jacket, and the content was stirred at 720 rpm. When the temperature of the content rose to 115° C., the stirring rate was reduced to 360 rpm, and a previously prepared mixture of 1.5 kg of the same SUMIKATHENE ® G801 powder as used in Example 1 and 6 kg of talc was added thereto. After mixing the content for 5 minutes, it was withdrawn out of the mixer. Thus, the whole talc adhered to the surface of the particulate polyolefin, and a spherical, free-flowing molding material comprising particulate polypropylene particles adhering talc thereto was obtained.

After completion of mixing, the inside of the mixer was checked to find almost no adhesion of the polymer to the inside wall.

(2) Molding:

This molding material was molded under the same condition as in Example 1-(3). The results thus obtained are shown in Table 2.

COMPARATIVE EXAMPLES 1 AND 2

(1) Preparation of molding material:

The same procedures as in Example 1-(2) and Example 2-(1) were conducted except for changing the conditions of mixing in the Super Mixer to 35° C. and 3 minutes. Most of talc and calcium carbonate particles were free from the particulate polypropylene, and a layer comprising the binder and the compounding additive was not substantially formed on the polypropylene particles. Thus, only a mixture having poor fluidity was obtained.

(2) Molding:

These molding materials were molded under the same condition as in Example 1-(3). The results thus obtained are shown in Table 2.

COMPARATIVE EXAMPLE 3

(1) Preparation of molding material:

The same procedures as described in Example 1-(2) were conducted except for not using the binder.

The resulting molding material contained much free talc, and only a portion of the talc adhered to the particulate polypropylene particles, which however, was separated away by lightly rubbing the particles with a finger.

(2) Molding:

The results obtained by molding this molding material under the same condition as in Example 1-(3) are shown in Table 2.

COMPARATIVE EXAMPLE 4

(1) Preparation of molding material:

The same procedures as described in Example 1 were conducted except for using 1.5 kg of zinc stearate (m.p.: 120° C.), a kind of stabilizer, in place of the binder and changing the mixing temperature to 125° C. Most of talc particles adhered to the particulate polypropylene particles. However, the talc particles were easily separated away by rubbing with a finger.

REFERENCE EXAMPLE (1) Particulate polypropylene, stabilizer, SUMIKATHENE® G801, and talc were merely mixed in amounts shown in Example 1-(2), and the resulting mixture was melt-kneaded at 230° C. in a screw type extruder to pelletize.

(2) Molding:

The resulting pellets were molded in the same manner as in Example 1-(3). The results thus obtained are shown in Table 2.

The results given in Table 2 clearly show that the molding material of the present invention provides the same moldability and moldings as that obtained by molding conventional pellets.

the molding materials obtained in Example 3 and Comparative Example 1 was, after a predetermined period of time, extruded at 230° C. by a screw type extruder and pelletized to measure melt index (according to ASTM D1238-65T). The results thus obtained are tabulated in Table 3. A higher melt index shows more deterioration.

TABLE 3

| | | Elapsed Time | | | |
|---|---|---|---|---|---|
| | | 1 hr | 1 month | 6 months | 1 year |
| Example 7 | Molding material obtained in Ex. 1 | 4.2 | 4.2 | 4.3 | 4.2 |
| Comparative Example 5 | Molding material obtained in Comparative Example 3 | 4.3 | 4.4 | 4.8 | 6.7 |

TABLE 1

| | Amount of Particulate Polypropylene, (kg) | Filler Kind | Filler Amount (kg) | Binder Kind | Binder Amount (kg) | Stabilizer Amount (g) | Mixing Manner Temp. (°C.) | Mixing Manner Order | Physical Properties of Molding Material *1 | *2 | *3 |
|---|---|---|---|---|---|---|---|---|---|---|---|
| Ex. 1 | 22.5 | Talc | 6 | Low-density polyethylene | 1.5 | 120 | 115 | mixing at a time | 0.65 | 27 | strong |
| Ex. 2 | 15 | CaCO₃ | 12 | Low-density polyethylene | 3 | 90 | 115 | mixing at a time | 0.75 | 27 | " |
| Ex. 3 | 23.4 | Talc | 6 | Low-density polyethylene | 0.6 | 120 | 145 | separately mixing talc | 0.64 | 27 | " |
| Ex. 4 | 22.5 | " | 6 | High-density polyethylene | 1.5 | 120 | 145 | mixing at a time | 0.65 | 27 | " |
| Ex. 5 | 22.5 | " | 6 | Propylene-butene-1 copolymer | 1.5 | 120 | 145 | mixing at a time | 0.65 | 27 | " |
| Ex. 6 | 22.5 | " | 6 | Low-density polyethylene | 1.5 | 120 | 145 | mixing talc and binder after raising temp. | 0.65 | 27 | " |
| Comparative Ex. 1 | 22.5 | Talc | 6 | Low-density polyethylene | 1.5 | 120 | 35 | mixing at a time | 0.48 | 49 | isolated |
| Comparative Ex. 2 | 15 | CaCO₃ | 12 | Low-density polyethylene | 3 | 90 | 35 | mixing at a time | 0.65 | 50 | " |
| Comparative Ex. 3 | 23.4 | Talc | 6 | — | — | 120 | 115 | mixing at a time | 0.50 | 40 | " |
| Comparative Ex. 4 | 22.5 | " | 6 | Zinc stearate | 1.5 | 120 | 125 | mixing at a time | 0.55 | 33 | weak |

*1: bulk density (g/cc);
*2: angle of repose (degree);
*3: state of adhesion

TABLE 2

| | Injection Molding Plasticizing Time (sec) | State of Molding Silver Streak | State of Molding Dispersion of Filler |
|---|---|---|---|
| Example 1 | 12–13 | no | good |
| Example 2 | " | " | " |
| Example 3 | " | " | " |
| Example 4 | " | " | " |
| Example 5 | " | " | " |
| Example 6 | " | " | " |
| Reference Example | 11–13 | no | good |
| Comparative Example 1 | 20–30 | observed | bad |
| Comparative Example 2 | " | much observed | " |
| Comparative Example 3 | 16–18 | observed | bad |

EXAMPLE 7 AND COMPARATIVE EXAMPLE 5

In order to demonstrate that deterioration of the molding material with time is depressed, part of each of The above results show that the molding material of the present invention does not undergo change with time and can be stored for a long time.

While the invention has been described in detail and with reference to specific embodiments thereof, it will be apparent to one skilled in the art that various changes and modifications can be made therein without departing from the spirit and scope thereof.

What is claimed is:

1. A particulate polyolefin molding material, comprising a particulate polyolefin particle having a bulk density of 0.45 g/cc or more and a mean particle size of 150 to 2,000μ, and having a coating of at least one layer comprising at least one compounding additive and an organic binder formed on the surface of said particle.

2. The particulate polyolefin molding material as claimed in claim 1, wherein said binder has a melting point lower than that of said particulate polyolefin by at least 3° C.

3. The particulate polyolefin molding material as claimed in claim 1, wherein said particulate polyolefin is a crystalline propylene homopolymer or copolymer.

4. The particulate polyolefin molding material as claimed in claim 1, wherein said coating is a single layer.

5. The particulate polyolefin molding material as claimed in claim 1, wherein said compounding additive includes a filler.

6. The particulate polyolefin molding material as claimed in claim 5, wherein the amount of the filler is 10 to 200 parts by weight per 100 parts by weight of the particulate polyolefin.

7. The particulate polyolefin molding material as claimed in claim 5, wherein said coating is two layers comprising an inner filler-rich layer and an outer layer mainly containing the binder.

8. The particulate polyolefin molding material as claimed in claim 1, wherein said coating is two layers comprising an inner layer containing a stabilizer, and an outer layer mainly comprised of the filler and the binder.

9. The particulate polyolefin molding material as claimed in claim 1, wherein said coating is two layers comprising an inner layer containing a stabilizer and a pigment, and an outer layer mainly comprised of the filler and the binder.

10. The particulate polyolefin molding material as claimed in claim 1, wherein said coating is two layers comprising an inner layer containing a stabilizer, a pigment and additional auxiliary agents, and an outer layer mainly comprised of the filler and the binder.

* * * * *